United States Patent [19]

Yamato et al.

[11] Patent Number: 5,256,199

[45] Date of Patent: Oct. 26, 1993

[54] CEMENT ADMIXTURE

[75] Inventors: Fuzio Yamato; Shuichi Fujita, both of Wakayama; Tatsuo Izumi, Osaka; Yoshiaki Tanisho; Kazushige Kitagawa, both of Wakayama, all of Japan

[73] Assignee: Kao Corporation, Tokyo, Japan

[21] Appl. No.: 737,482

[22] Filed: Jul. 30, 1991

[30] Foreign Application Priority Data

| Aug. 3, 1990 [JP] | Japan | 2-206523 |
| Sep. 26, 1990 [JP] | Japan | 2-258300 |
| Sep. 26, 1990 [JP] | Japan | 2-258302 |

[51] Int. Cl.$^5$ .................. C04B 24/02; C04B 24/12
[52] U.S. Cl. .................... 106/823; 106/724; 106/725; 106/727; 106/728; 106/802; 106/808; 106/809; 106/810; 106/819; 106/822; 568/448; 568/454
[58] Field of Search ............ 106/724, 725, 727, 728, 106/802, 808, 809, 810, 819, 822, 823; 568/448, 454

[56] References Cited

U.S. PATENT DOCUMENTS

| 4,272,430 | 6/1981 | Pieh et al. | 528/256 |
| 4,430,469 | 2/1984 | Burge et al. | 528/254 |
| 4,454,311 | 6/1984 | Burge et al. | 528/245 |
| 4,501,839 | 2/1985 | Burge et al. | 524/247 |
| 4,759,802 | 7/1988 | Ochi et al. | 106/725 |
| 4,936,918 | 1/1990 | Furuhashi et al. | 106/725 |

FOREIGN PATENT DOCUMENTS

| 0006135 | 1/1980 | European Pat. Off. |
| 0059353 | 9/1982 | European Pat. Off. |
| 0077904 | 5/1983 | European Pat. Off. |
| 0308915 | 3/1989 | European Pat. Off. |
| 60-11257 | 1/1985 | Japan . |
| 2202850 | 9/1987 | Japan . |
| 1-113419 | 5/1989 | Japan . |

OTHER PUBLICATIONS

Chemical Abstracts, vol. 90, No. 18, Apr. 1979, Abstract No. 141454w.
Chemical Abstracts, vol. 95, No. 20, Nov. 1981, Abstract No. 17437.

*Primary Examiner*—Mark L. Bell
*Assistant Examiner*—Anthony J. Green
*Attorney, Agent, or Firm*—Birch, Stewart, Kolasch & Birch

[57] ABSTRACT

Cement and aggregates are mixed with each other by the use of a dispersant to the effect of water reduction and prevention of slump loss, the dispersant comprising (1) (I), (IIa), and an amine reaction terminator of (IIb), (IIc), (IVg) and/or (IVh); (2) (I), (IIb) and/or (IIc) and (IIIe) and/or (IIIf); or (3) (I), (IIa) and (IIIe) and/or (IIIf), in which formulae, R is hydrogen or an alkyl having 1 to 6 carbon atoms; X is an alkali metal; $X_1$ is hydrogen, an alkyl having 1 to 6 carbon atoms, carboxylic acid group, an alkali metal salt carboxylate, sulfonic acid group, an alkali metal salt sulfonate, hydroxy or methoxy; $Y_1$ is carboxylic acid or an alkali metal salt carboxylate, sulfonic acid or an alkali metal salt sulfonate; Y is hydrogen or an alkali metal; Z is hydrogen, an alkyl having 1 to 6 carbon atoms or $-CH_2SO_3M$; and M is hydrogen or an alkali metal.

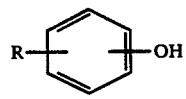

(I)

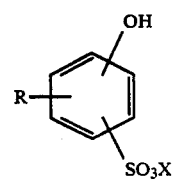

(IIa)

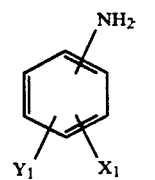

(IIb)

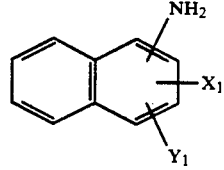

(IIc)

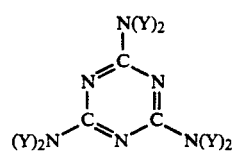

(IIIe)

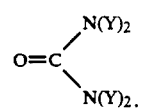

(IIIf)

8 Claims, No Drawings

CEMENT ADMIXTURE

FIELD OF INDUSTRIAL APPLICATION

The present invention relates to a cement admixture, and more particularly to a cement admixture used as a water-reducing admixture and a slump loss preventive, etc., in cement compositions, such as cement paste, mortar and concrete.

PRIOR ART

In general, hydraulic cement compositions lose their fluidity with the lapse of time after mixing (this phenomenon will be hereinafter referred to as "slump loss"), so that there occurs a problem on workability in execution of work. Specifically, it is known that naphthalene and melamine admixtures which have hitherto been added as a cement dispersant brings about a large slump loss.

Although the addition of a hardening retardant, such as a salt of a hydroxycarboxylic acid or a salt of lignosulfonic acid, has been proposed as a measure for preventing the slump loss, even this method brings about delay in the troweling of concrete and lowering in the initial strength and further cannot exhibit any sufficient effect of preventing the slump loss, i.e., cannot provide any fundamental solution to the problem.

In general, hydraulic cement compositions lose their fluidity with the lapse of time after mixing (this phenomenon will be hereinafter referred to as "slump loss"), so that there occurs a problem on workability in execution of work.

Specifically, it is known that naphthalene, melamine, polycarboxylic acid and other admixtures which have hitherto been added as a cement dispersant have a linear molecular structure and brings about a large slump loss. A phenol-melamine copolycondensate and a sulfanilic acid-phenol copolycondensate described in Japanese Patent Laid-Open No. 113419/1989 slightly exhibit the effect of preventing the slump loss. This effect, however, is unsatisfactory. In particular, a concrete containing a high performance water reducing agent represented by a condensate of a salt of naphthalenesulfonic acid with formalin exhibits a remarkable slump loss due to a high degree of water reduction.

SUMMARY OF THE INVENTION

An object of the present invention is to provide a cement admixture, particularly a concrete admixture, capable of improving the consistency of a cement composition and, at the same time, alleviating the slump loss. More particularly, an object of the present invention is to provide such a cement admixture that the addition to a cement composition increases the percentage water reduction by virtue of an improvement in the fluidity of the cement composition, enables the cement composition to be transported without causing a slump loss for a long period of time, and facilitates pumping.

The invention provides a cement additive or dispersant comprising a condensation product of formaldehyde with:

(I), (IIa) and (IIb);
(I), (IIa) and (IIc);
(I), (IIa) and (IVg);
(I), (IIa) and (IVh);
(I), (IIa), (IIb) and (IIc);
(I), (IIa), (IIb) and (IVg);
(I), (IIa), (IIb) and (IVh);
(I), (IIa), (IIb), (IIc) and (IVg);
(I), (IIa), (IIb), (IVg) and (IVh);
(I), (IIa), (IIb), (IIc) and (IVh);
(I), (IIa), (IIb), (IIc), (IVg) and (IVh);
(I), (IIa), (IIc) and (IVg);
(I), (IIa), (IIc) and (IVh);
(I), (IIa), (IIc), (IVg) and (IVh);
(I), (IIa), (IVg) and (IVh);
(I), (IIb) and (IIIe);
(I), (IIc) and (IIIe);
(I), (IIb) and (IIIf);
(I), (IIc) and (IIIf);
(I), (IIb), (IIc) and (IIIe);
(I), (IIb), (IIc) and (IIIf);
(I), (IIb), (IIIe) and (IIIf);
(I), (IIc), (IIIe) and (IIIf);
(I), (IIb), (IIc), (IIIe) and (IIIf);
(I), (IIa) and (IIIe);
(I), (IIa) and (IIIf); or
(I), (IIa), (IIIe) and (IIIf)
in which
(I) is a phenol compound having the formula (I),
(IIa) is a phenol sulfonate having the formula (IIa),
(IIb) is an aniline compound having the formula (IIb)
(IIc) is an aminonaphthalene compound having the formula (IIc);
(IIIe) is a melamine compound having the formula (IIIe);
(IIIf) is a urea compound having the formula (IIIf);
(IVg) $H_2NCONCZ)CH_2SO_3M$ and
(IVh) $H_2NSO_3M$,

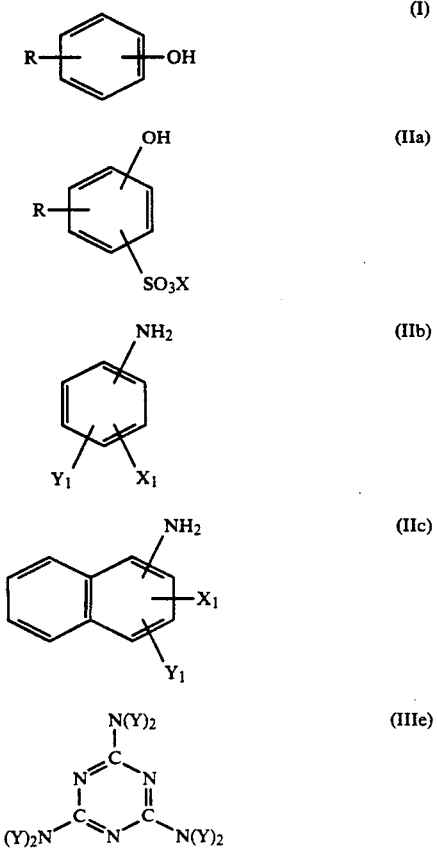

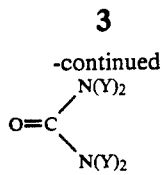

(IIIf)

wherein
R is hydrogen or an alkyl having 1 to 6 carbon atoms;
X is an alkali metal;
$X_1$ is hydrogen, an alkyl having 1 to 6 carbon atoms, a carboxylic acid group, an alkali metal carboxylate, a sulfonic acid group, an alkali metal salt sulfonate, hydroxy or methoxy;
$Y_1$ is a carboxylic acid or an alkali metal carboxylate, a sulfonic acid or an alkali metal sulfonate;
Y is hydrogen or an alkali metal;
Z is hydrogen, an alkyl having 1 to 6 carbon atoms or $CH_2SO_3M$ and
M is hydrogen or an alkali metal.

The invention includes the following three embodiments which are narrower in scope:

(1') a condensation product of formaldehyde with (I), (IIa) and (IIb); in which $X_1$ is hydrogen; and $Y_1$ is an alkali metal sulfonate group;

(2') a condensation product of formaldehyde with (I), (IIb) and (IIIe); or (I), (IIb) and (IIIf); in which $X_1$ is hydrogen; $Y_1$ is sulfonic acid group or an alkali metal sulfonate group; and Y is hydrogen; and (3') a condensation product of formaldehyde with (I), (IIa) and (IIIe); (I), (IIa) and (IIIf); or (I), (IIa), (IIIe) and (IIIf) in which Y is hydrogen.

It is preferable that the alkyl group has 1 to 3 carbon atoms and the alkali metal includes sodium, potassium and lithium.

The invention further provides a cement composition which comprises cement, aggregates and the additive as defined above and then a method for dispersing cement and aggregates with each other by using the additive as defined above.

The invention further provides a cement composition which comprises cement, aggregate such as sand and pieces of stone and the additive as defined above, a method for dispersing cement, sand and aggregate with each other by using the additive as defined above and a process for producing concrete by mixing cement with aggregate by water and the additive.

The invention includes the following three groups of embodiments of co-monomers: The group (1) includes:
(I), (IIa) and (IIb);
(I), (IIa) and (IIc);
(I), (IIa) and (IVg);
(I), (IIa) and (IVh);
(I), (IIa), (IIb) and (IIc);
(I), (IIa), (IIb) and (IVg);
(I), (IIa), (IIb) and (IVh);
(I), (IIa), (IIb), (IIc) and (IVg);
(I), (IIa), (IIb), (IVg) and (IVh);
(I), (IIa), (IIb), (IIc) and (IVh);
(I), (IIa), (IIb), (IIc), (IVg) and (IVh);
(I), (IIa), (IIc) and (IVg);
(I), (IIa), (IIc) and (IVh);
(I), (IIa), (IIc), (IVg) and (IVh); and
(I), (IIa), (IVg) and (IVh).

The group (1) substantially comprises (I), (IIa) and an amine reaction terminator or an amine-type polymerization terminator of (IIb), (IIc), (IVg) and/or (IVh).

It is preferable that molar proportions of (I), (IIa) and the amine reaction terminator are 0.1–1.0: 0.1–1.0: 0.1–1.0, more preferably 0.1–1.0: 0.1–0.5: 0.5–1.0.

The group (2) includes:
(I), (IIb) and (IIIe);
(I), (IIc) and (IIIe);
(I), (IIb) and (IIIf);
(I), (IIc) and (IIIf);
(I), (IIb), (IIc) and (IIIe);
(I), (IIb), (IIc) and (IIIf);
(I), (IIb), (IIIe) and (IIIf);
(I), (IIc), (IIIe) and (IIIf); and
(I), (IIb), (IIc), (IIIe) and (IIIf).

The group (2) subtantially comprises (I), (IIb) and/or (IIc) and (IIIe) and/or (IIIf).

It is preferable that molar proportions of (I), (IIb) and/or (IIc) and (IIIe) and/or (IIIf) are 0.1–1.0: 0.1–1.0: 0.1–1.0, more preferably 0.1–1.0: 0.1–0.5: 0.5–1.0.

The group (3) includes:
(I), (IIa) and (IIIe);
(I), (IIa) and (IIIf); and
(I), (IIa), (IIIe) and (IIIf)

The group (3) subtantially comprises (I), (IIa) and (IIIe) and/or (IIIf).

It is preferable that molar proportions of (I), (IIa) and (IIIe) and/or (IIIf) are 0.1–1.0: 0.1–1.0: 0.1–1.0, more preferably 0.1–1.0: 0.1–0.5: 0.5–1.0.

The invention will be described in each group of embodiments.

GROUP (1) OF EMBODIMENTS

It is supposable that the addition copolycondensate of the above-described three components with formaldehyde used in the present invention might enhance the adsorption of the dispersant to cement particles and increases the electrical repulsion of the surfaces of particles, which contributes to an alleviation of the slump loss.

The adsorption of the dispersant to cement particles generally varies depending upon a functional group in its molecule. The three components of the present invention have five functional groups in total, i.e., one functional group of a hydroxyl group in the phenol compound, two functional groups of a hydroxyl group and a sulfonate group in the third co-monomer. phenol-sulfonate and two functional groups of an amino group and a sulfonate group in the Therefore, it is conceivable that the addition copolycondensate of the present invention exhibits an excellent effect of alleviating the slump loss by virtue of a strong adsorption to cement particles and an increase in the density of electric charges on the surfaces of particles. The conventional cement admixture has a functional group in the cases of naphthalene sulfonate type and melamine sulfonate type admixtures and three functional groups in the case of a phenol-sulfanilic acid copolycondensate shown in JP-A 1-113 419, so that the number of functional groups per molecular weight of the copolycondensate of the present invention is larger than that of the conventional cement admixtures. Therefore, the addition polycondensate of the invention exhibits a superior effect in respect of the dispersibility and the prevention of slump loss to the conventional cement admixture as is apparent also from working examples which will be described later.

In the general formulae (I) and (IIa), R is hydrogen or a lower alkyl group. Preferred examples of the lower alkyl group include straight-chain and branched alkyl groups having 1 to 6 carbon atoms, such as methyl, ethyl, propyl, isopropyl, butyl, pentyl and hexyl.

The compound represented by the general formula (IIa) is a phenol compound or its alkali salt. Although there is no particular limitation on the alkali salt, sodium salt and potassium salt are preferred.

The third co-monomer is called an amine type polymerization terminator or an amino reaction terminator, including (IIb), (IIc), (IVg) and (IVh). It has reactive groups such as sulfonic, carboxylic, hydroxy and methoxy, in addition to amino. A reactive group other than amino serves to decrease electron density of the amino group and eventually to control addition of formaldehyde to the amino group for the purpose of production of monomethylol. This way the condensation intended in the invention proceeds.

The condensation may be effected and executed at a pH value range between 3 and 12, preferably 7 and 9 or 3 and for (IVg). A pH range of 7 to 11 may be applied two times in which methylol addition is executed at 7.5 to 8.5 and then condensation, at 9.5 to 11.

The polymerization terminator is described in the paragraph of the group (2) in respect to (IIb) and (IIc).

In addition it preferably includes N-methylsulfonyl urea, N,N-dimethylsulfonic urea and sulfamic acid and an alkali metal salt of each foregoing compound.

The condensation product is preferred to have an average molecular weight of 1,000 to 50,000, more preferable 2,000 to 20,000. Moreover it is preferable that the product has a ratio of a weight-average molecular weight (Mw) to a number-average molecular weight (Mn) at 5.0 or below, more preferebly 3.0 or below.

It is preferable that the third co-monomer has an amino and one or more sulfonic group or other two or more groups such as carboxylic group.

It is preferable that a molar ratio of the reaction terminator to the sum total of (I) and (IIa) ranges from 0.2:1.0 to 5.0:1.0. It is preferable that a molar ratio of (I) to (IIa) is 0.1:1.0 to 1.0:0.1.

A 30 to 40 wt. % aqueous solution of formaldehyde may be used. Formaldehyde may be used in an amount of 0.7 to times, preferably 0.9 to 2.5 times as much as the sum total of the co-monomers.

An example in which the polymerization terminator is (IIb), X is here hydrogen and Y is here —SO$_3$X, being called here (IIId), is below illustrated.

The polycondensate can be obtained various ways. It may be synthesized under a basic condition The reaction may be conducted by adding formalin dropwise to a phenol compound, a phenolsulfonic acid compound and a sulfanilic acid compound, or a process which comprises first methylolating a phenolsulfonic acid compound and/or a sulfanilic acid compound with formalin and then adding a phenol compound to the reaction product. Any of the above described processes may be used as far as the reaction is conducted under a basic condition.

A typical process for producing the addition copolycondensate of formaldehyde according to the present invention will now be described, though the present invention is not limited to this process only.

Predetermined amounts of phenol, sodium phenolsulfonate, sodium sulfanilate and water are weighed and the pH value (7 to 8.5) and solid content are adjusted. The mixture is put in a reaction vessel, and formalin (a 37% aqueous formaldehyde solution) is added in drops to the mixture at 80° to 90° C. over a period of 1 to 3 hr. After the completion of the addition, the mixture is stirred under reflux for 3 to 30 hr. The reaction mixture is cooled to 30° C. and the pH value is adjusted to 10 to 11. The reaction mixture is further stirred under reflux for 3 to 10 hr and then cooled, thereby preparing the cement admixture of the present invention.

GROUP (2) OF EMBODIMENTS

It is supposable that the addition copolycondensate of the above-described three to five components with formaldehyde used in the present invention could alleviate the slump loss by virtue of its three-dimensional molecular structure.

In the addition of formaldehyde to the three to five components constituting the addition copolycondensate of the present invention, the number of methylol groups added to phenol may be 3, the number of methylol groups added to the aniline derivative may be 4, the number of methylol groups added to the aminonaphthalene derivative may be 8, the number of methylol groups added to melamine may be 6, and the number of methylol groups added to urea may be 4. Therefore, by virtue of a large number of addition of methylol groups as well, the copolycondensate of the adduct of methylol with the above-described three to five components can form a multidimensional structure more easily than the conventional dispersants. Therefore, the addition polycondensate of the three to five components with formaldehyde exhibits an excellent effect in respect of the dispersibility and the prevention of slump loss as is apparent also from working examples which will be described later.

In the present invention, the three to five components represented by the above-described general formulae (I), (IIb) and/or (IIc), (IIIe) and/or (IIIf) are subjected to addition copolycondensation with formaldehyde. In the general formula (I), R is hydrogen or a lower alkyl group. Preferred examples of the lower alkyl group include straight-chain and branched alkyl groups having 1 to 6 carbon atoms, such as methyl, ethyl, propyl, isopropyl, butyl, pentyl and hexyl.

The compound represented by the above-described formula (IIb) preferably includes an aniline compound having at least one sulfonic group or its metal salt. The compound of the formula (IIc) is an aminonaphthalene compound having at least one sulfonic group or its melt salt. (IIb) and (IIc) may be used one by another or their combination. (IIb) and (IIc) preferably includes sulfanilic acid, metanilic acid, naphthionic acid, 1-naphthylamine-6-sulfonic acid (Cleve's acid), 1 naphthylamine-5sulfonic acid (Laurent's acid), 1-naphthylamine-3,6-disulfonic acid or their alkali metal salts. Examples of the alkali metal include sodium, potassium and lithium. In the present invention, the above-described compounds may be used in combination with sulfamic acid (NH$_2$—SO$_3$H) or its alkali metal salt.

The compound represented by the formula (IIIe) is melamine or a sulfomethylated melamine. The compound represented by the formula (IIIf) is urea or a sulfomethylated urea. In the present invention, use are made of one or both of the compounds represented by the formulae (IIIe) and (IIIf).

Among the compounds represented by the general formulae (IIIe) and (IIIf), those having a sulfomethyl group are prepared by sulfomethylating the corresponding starting materials. The sulfomethylation may be conducted in monomer stage. Alternatively, it may be conducted on the formed copolycondensate. Further, in conducting sulfomethylation in a monomer stage, individual monomers may be separately sulfomethylated. Alternatively, the sulfomethylation may be conducted on a mixture of starting monomers including monomers represented by the formulae (I), (IIb) and (IIc). It is preferred to sulfomethylate the individual monomers separately from the viewpoint of controlling the properties of the resultant copolycondensate. However, the sulfomethylation may be conducted on a mixture of monomers represented by the formulae (I) to (IIIf) from the viewpoint of simplification of the process.

The sulfomethylation may be conducted through the use of known sulfonating agents such as sodium sulfite, sodium hydrogensulfite or sodium pyrosulfite. Among them, sodium pyrosulfite is preferred from the viewpoint of less influence on pH change of the system. The complete sulfomethylation of the monomer is preferred from the view point of the control of the properties of the copolymer.

It is conceivable that the sulfomethylation of melamine proceeds through the addition condensation of formaldehyde with an amino group of melamine. As a result a methylol group is introduced into melamine followed by replacment of the hydroxyl group in the methylol group by a sulfo group derived from the above-described sulfonating agent. In this case, there may be six bondable sites. Among them, however, two sites may be used for the formation of the copolycondensate according to the present invention, so that, the sulfomethyl group can be introduced into not more than four sites per melamine monomer. In the present invention, any of the above-described cases are possible.

About 1 to 5 moles of formaldehyde is preferably used per 1 mole of the entire co-monomers (I) to (IIIf), being in the form of a 30 to 40 wt. % aqueous solution thereof.

The addition condensation reaction of formaldehyde can be conducted under a basic condition of a pH value in the range of from 7 to 11. With consideration of the efficiency of the methylol addition reaction and condensation reaction, however, it is preferred to conduct a two-stage reaction through the adjustment of the pH, i.e., a methylolation at a pH value of 7.5 to 8.5 and a condensation reaction at a pH value of 9.5 to 11.

In the addition condensate of the present invention, the average molecular weight of the polycondensate is preferably 1,000 to 50,000, still preferably about 2,000 to 20,000.

GROUP (3) OF EMBODIMENTS

According to the present invention, there is provided a cement admixture characterized by comprising as an indispensable component a copolycondensate prepared by subjecting three or four components of compounds represented by the general formulae (I), (IIa), (IIIe) and/or (IIIf) to addition copolycondensation with formaldehyde.

It is supposable that the addition copolycondensate of the above-described three components with formaldehyde used in the present invention could alleviate the slump loss by virtue of its three-dimensional molecular structure.

In the addition of formaldehyde to the three or four components constituting the addition copolycondensate of the present invention, the number of methylol groups added to phenolsulfonic acid may be 2, the number of methylol groups added to phenol may be 3, the number of methylol groups added to melamine may be 6, and the number of methylol groups added to urea may be 4. Therefore, by virtue of a large number of addition of methylol groups as well, the copolycondensate of the adduct of methylol with the above-described three components can form a multidimensional structure more easily than the conventional dispersants including naphthalene sulfonate type and melamine sulfonate type dispersants and phenolsulfanilic acid copolycondensates shown in JP-A 1-113419.

In the present invention, the three or four components represented by the above-described general formulae (I), (IIa), (IIIe) and/or (IIIf) are subjected to addition copolycondensation with formaldehyde. With respect to each monomer compound, reference may be made to the above description.

The molecular weight of the copolycondensate of the present invention is preferably 1000 to 50000, still preferably about 2000 to 20000.

The number of moles of formaldehyde in the addition condensation reaction according to the present invention is preferably about 1 to 5 mol per mole of the total of the compounds represented by the general formulae (I), (IIa), (IIIe) and/or (IIIf).

There is no particular limitation on the process for producing the addition polycondensate according to the present invention. Specifically, use may be made of synthetic means generally used under a basic condition, for example, a reaction conducted by adding formalin (a 37% aqueous formaldehyde solution; the same shall apply hereinafter) in drops to a phenol compound, a phenolsulfonic acid compound, (sulfomethylated) melamine and/or (sulfomethylated) urea, or a process which comprises first methylolating a phenolsulfonic acid compound with formalin and then adding a phenol compound, (sulfomethylated) melamine and/or (sulfomethylated) urea to the reaction product for addition condensation. Any of the above-described processes may be employed as far as the reaction is conducted under a basic condition.

A typical process for producing the addition copolycondensate of formaldehyde according to the present invention will now be described, though the present invention is not limited to this process only.

Predetermined amounts of phenol, sodium phenolsulfonate and melamine (sulfonic acid) and/or urea (sulfonic acid) and water are weighed and the pH value (7 to 8.5) and solid content are adjusted. The mixture is put in a reaction vessel, and formalin is added in drops to the mixture at 80° to 90° C. over a period of 1 to 3 hr. After the completion of the addition, the mixture is stirred under reflux for 3 to 30 hr. The reaction mixture is cooled to 30° C. and the pH value is adjusted to 10 to 11. The reaction mixture is further stirred under reflux for 3 to 10 hr and then cooled, thereby preparing the cement admixture of the present invention.

In the cement admixture of the present invention, it is also possible to utilize an oxidation reaction, for example, an oxidation reaction described in Japanese Patent Laid-Open Nos. 11257/1985 and 202850/1987. In this case as well, the resultant product is a dispersant having many functional groups.

The cement admixture of the present invention is used as a dispersant for a cement composition, such as concrete, mortar or cement paste. It is preferably added simultaneously with the pouring of water from the viewpoint of preventing the occurrence of slump loss. Alternatively, the addition may be conducted between immediately after the pouring of water and after the completion of kneading. Further, it may be added to an already kneaded cement mixture. Further, the additive of the invention may be used with another dispersant such as naphthalene sulfonate type condensates.

The cement admixture of the present invention may be used alone or in combination with known cement admixtures. In particular, even in the case of a cement admixture having a large slump loss, the slump loss can be alleviated when it is used together with the cement admixture of the present invention. The proportions of mixing of the cement admixture according to the present invention with known cement admixture may be any proportion depending upon the purpose of use of the admixture. However, when the amount of mixing of the cement admixture of the present invention is 5% by weight or less, no significant effect of alleviating the slump loss can be expected. Examples of known cement admixtures useable in combination with the cement admixture of the present invention include a condensate of formaldehyde with naphthalenesulfonic acid or its metal salt, a condensate of formaldehyde with an alkylnaphthalenesulfonic acid or its metal salt, a condensate of formaldehyde with melaminesulfonic acid or its metal salt and ligninsulfonic acid or its metal salt. Among them, at least one member selected from the group consisting of a condensate of formaldehyde with naphthalenesulfonic acid or its metal salt and a condensate of formaldehyde with melaminesulfonic acid or its metal salt are preferred. When the cement admixture of the present invention is used in combination with the above-described conventional cement admixture, there is no particular limitation of the method of the addition thereof and they may be added in the form of a mixture or separately added.

Further, the cement admixture of the present invention may be used in combination with other known cement additives, for example, high-performance water-reducing agents, fluidizing agents, AE agents, AE water-reducing agents, retardants, high-early-strengthening agents, accelerators, foaming agents, water holding agents, thickeners, waterproofing agents, rust preventives, colorants, mildew preventives, crack reducing agents, polymeric emulsions, blast furnace slag, water-soluble polymers, inflating agents, fly ash, silica fume, sustained release dispersants, and sustained release foaming agents.

EXAMPLES

The present invention will now be described in more detail by referring to the following Examples on groups (1), (2) and (3) of embodiments, though it is not limited to these Examples only.

GROUP (1) OF EMBODIMENTS

Production Example (1) of Addition Condensate

A reaction vessel equipped with a stirrer was charged with 0.1 mol of phenol, 0.5 mol of sodium phenolsulfonate and 1.0 mol of sodium sulfanilate, and a 0.1 N aqueous sodium hydroxide solution and water were added thereto to adjust the pH value to 8.5 and the solid content to 35% by weight. Then, the solution was heated to a temperature of 85° C., and 2.0 mol of formalin (a 37% aqueous formaldehyde solution; the same shall apply hereinafter) was added thereto with stirring, and the reaction mixture was stirred under reflux for 8 hr. Thereafter, the reaction mixture was cooled to 30° C., and the pH value was adjusted to 11 with a 40% aqueous sodium hydroxide solution. The mixture was stirred under reflux for 12 hr and cooled, and water was added thereto to adjust the solid content to 25% by weight, thereby preparing the cement admixture of the present invention.

The details of addition condensate Nos. 1 to 7 of the present invention prepared according to the Production Example (1) are given in Table 1.

Production Example (2) of Addition Condensate

A reaction vessel equipped with a stirrer was charged with 0.6 mol of m-cresol, 0.5 mol of sodium phenolsulfonate and 1.0 mol of sodium sulfanilate, and a 0.1 N aqueous sodium hydroxide solution and water were added thereto to adjust the pH value to 8.5 and the solid content to 35% by weight. Then, the solution was heated to a temperature of 85° C., and 2.5 mol of formalin was added thereto with stirring, and the reaction mixture was stirred under reflux for 8 hr. Thereafter, the reaction mixture was cooled to 30° C., and the pH value was adjusted to 11 with a 40% aqueous sodium hydroxide solution. The mixture was stirred under reflux for 12 hr and cooled, and water was added thereto to adjust the solid content to 25% by weight, thereby preparing the cement admixture of the present invention.

The details of addition condensates Nos. 8 to 10 of the present invention prepared according to the Production Example (2) are given in Table 2.

TABLE 1

| Addition condensate No. | Starting materials (molar ratio) | | | | Average molecular weight of produced addition polymer* | Mw/Mn |
|---|---|---|---|---|---|---|
| | phenol | sodium phenolsulfonate | sodium sulfanilate | formalin | | |
| 1 | 0.10 | 0.50 | 1.00 | 2.0 | 4600 | 1.4 |
| 2 | 0.30 | 0.50 | 0.90 | 2.5 | 5200 | 1.6 |
| 3 | 0.50 | 0.50 | 0.75 | 3.0 | 6600 | 1.6 |
| 4 | 0.50 | 0.50 | 0.50 | 2.5 | 8500 | 1.8 |
| 5 | 0.60 | 0.40 | 1.00 | 3.0 | 11000 | 2.1 |
| 6 | 0.70 | 0.30 | 1.00 | 3.0 | 12700 | 2.0 |
| 7 | 1.00 | 0.10 | 1.00 | 3.5 | 21500 | 2.5 |

Note:
*measured by gel permeation chromatography (in terms of average molecular weight of polystyrene)

TABLE 2

| Addition condensate No. | Starting materials (molar ratio) | | | | Average molecular weight of produced addition polymer* |
|---|---|---|---|---|---|
| | m-cresol | sodium phenolsulfonate | sodium sulfanilate | formalin | |
| 8 | 0.60 | 0.50 | 1.00 | 2.5 | 3400 |
| 9 | 0.60 | 0.10 | 1.00 | 2.5 | 4100 |

TABLE 2-continued

| Addition condensate No. | Starting materials (molar ratio) | | | | Average molecular weight of produced addition polymer* |
|---|---|---|---|---|---|
| | m-cresol | sodium phenol-sulfonate | sodium sulfanilate | for-malin | |
| 10 | 1.00 | 0.50 | 0.50 | 3.0 | 5200 |

Note:
*measured by gel permeation chromatography (in terms of average molecular weight of polystyrene)

Production Example (3) of Addition Condensate

A reaction vessel equipped with a stirrer was charged with 0.5 mol of phenol, 0.5 mol of sodium m-cresolsulfonate and 1.0 mol of sodium sulfanilate, and a 0.1 N aqueous sodium hydroxide solution and water were added thereto to adjust the pH value to 8.5 and the solid content to 35% by weight. Then, the solution was heated to a temperature of 85° C., and 2.0 mol of formalin was added thereto with stirring, and the reaction mixture was stirred under reflux for 8 hr. Thereafter, the reaction mixture was cooled to 30° C., and the pH value was adjusted to 11 with a 40% aqueous sodium hydroxide solution. The mixture was stirred under reflux for 12 hr and cooled, and water was added thereto to adjust the solid content to 25% by weight, thereby preparing the cement admixture of the present invention.

The details of addition condensates Nos. 11 to 13 of the present invention prepared according to the Production Example (3) are given in Table 3.

TABLE 3

| Addition condensate No. | Starting materials (molar ratio) | | | | Average molecular weight of produced addition polymer* |
|---|---|---|---|---|---|
| | phenol | sodium m-cresol-sulfonate | sodium sulfa-nilate | for-malin | |
| 11 | 0.50 | 0.50 | 1.00 | 2.0 | 4200 |
| 12 | 0.50 | 0.10 | 1.00 | 2.8 | 3100 |
| 13 | 0.50 | 0.50 | 0.75 | 3.0 | 3700 |

Note:
*measured by gel permeation chromatography (in terms of average molecular weight of polystyrene)

Production Example (4) of Addition Condensate

A reaction vessel equipped with a stirrer was charged with 0.5 mol of phenol, 0.5 mol of sodium phenolsulfonate and 1.0 mol of sodium sulfanilate, and a 0.1 N aqueous sodium hydroxide solution and water were added thereto to adjust the pH value to 8.5 and the solid content to 35% by weight. Then, the solution was heated to a temperature of 85° C., 2.0 mol of formalin was added thereto with stirring, and the reaction mixture was stirred under reflux for 5 to 30 hr (first step). Thereafter, the reaction mixture was cooled to 30° C., and the pH value was adjusted to 11 with a 40% aqueous sodium hydroxide solution. The mixture was stirred under reflux for 6 hr (second step) and cooled, and water was added thereto to adjust the solid content to 25% by weight, thereby preparing the cement admixture of the present invention.

The details of addition condensates Nos. 14 to 16 of the present invention prepared according to the Production Example (4) are given in Table 4.

TABLE 4

| Addition condensate No. | Starting materials* (molar ratio) Ph:PhS:Su | Conditions for addition condensation | | Average molecular weight of produced addition polymer** | Mw/Mn |
|---|---|---|---|---|---|
| | | 1st step (hr) | 2nd step (hr) | | |
| 14 | 0.5:0.5:1.0 | 5 | 6 | 7500 | 1.6 |
| 15 | 0.5:0.5:1.0 | 15 | 6 | 11500 | 2.0 |
| 16 | 0.5:0.5:1.0 | 30 | 6 | 39000 | 2.8 |

Note:
*Ph: phenol
PhS: sodium phenolsulfonate
Su: sodium sulfanilate
Formaldehyde was used at a molar ratio of 2.0. to the above.
**measured by gel permeation chromatography (in terms of average molecular weight of polystyrene)

Evaluation of Addition Condensates as Cement Admixture (1) Mixing of concrete was conducted as follows:
W/C=55%, S/A=49% and C=320 kg/m$^3$
wherein C represents cement, W represents water, S represents fine aggregates and A represents the whole aggregates.

(2) Materials used were as follows:
cement: central portland cement
fine aggregate: occurring in the Kino river
coarse aggregate: crushed stone occurring in Takarazuka (3) A tilting barrel mixer was used, and the concrete was kneaded for 3 min and then stirred for 60 min at 4 rpm. The results of evaluation are given in Table 5.

Results are shown in terms of slump just after mixing (immediately after preparation), that in 60 minutes after mixing (60 min after preparation) and then a difference between both and an amount of air(%) just after mixing (immediately after preparation) and that in 60 mins. after mixing (60 min after preparation).

TABLE 5

| Classification | Addition condensate No. | Amt. of addition (%)* | Slump (cm) | | | Amt. of air (%) | |
|---|---|---|---|---|---|---|---|
| | | | immediately after preparation | 60 min after preparation | difference | immediately after preparation | 60 min after preparation |
| Products of the present invention | 1 | 0.49 | 20.1 | 19.1 | 1.0 | 1.1 | 0.9 |
| | 2 | 0.49 | 20.1 | 19.1 | 1.0 | 1.2 | 1.0 |
| | 3 | 0.48 | 20.1 | 19.0 | 1.1 | 1.2 | 1.0 |
| | 4 | 0.49 | 20.0 | 16.5 | 3.5 | 1.2 | 1.0 |
| | 5 | 0.54 | 20.1 | 16.1 | 4.0 | 1.4 | 1.2 |
| | 6 | 0.52 | 20.2 | 17.1 | 3.1 | 1.1 | 1.0 |

TABLE 5-continued

| Classification | Addition condensate No. | Amt. of addition (%)* | Slump (cm) | | | Amt. of air (%) | |
|---|---|---|---|---|---|---|---|
| | | | immediately after preparation | 60 min after preparation | difference | immediately after preparation | 60 min after preparation |
| | 7 | 0.54 | 20.0 | 16.3 | 3.7 | 1.5 | 1.3 |
| | 8 | 0.53 | 20.1 | 15.7 | 4.4 | 1.1 | 1.0 |
| | 9 | 0.50 | 20.1 | 17.1 | 3.0 | 1.2 | 1.1 |
| | 10 | 0.50 | 20.1 | 17.2 | 2.9 | 1.2 | 1.0 |
| | 11 | 0.51 | 20.2 | 18.0 | 2.2 | 1.2 | 1.0 |
| | 12 | 0.50 | 20.2 | 17.0 | 3.2 | 1.2 | 1.0 |
| | 13 | 0.51 | 20.1 | 17.1 | 3.0 | 1.1 | 1.0 |
| | 14 | 0.50 | 20.2 | 17.1 | 3.1 | 1.3 | 1.1 |
| | 15 | 0.54 | 20.1 | 19.0 | 1.1 | 1.2 | 1.0 |
| | 16 | 0.57 | 20.1 | 15.4 | 4.7 | 1.4 | 1.0 |
| Comparative products | A** | 0.60 | 20.1 | 7.8 | 12.3 | 2.1 | 1.4 |
| | B** | 0.67 | 20.2 | 7.2 | 13.0 | 1.2 | 1.0 |

Note:
*Amt. of addition: solid content (%) based on cement
**Comparative Product A: naphthalene dispersant (Mighty 150; a product of Kao Corp.)
***Comparative Product B: melamine dispersant (Melment; a product of Showa Denko K.K.)

Results of Evaluation

As is apparent from Table 5, the admixtures of the present invention have a smaller difference in the slump value between immediately after the preparation and 60 min after the preparation than that of the admixtures of the Comparative Examples and exhibit an excellent effect of water reduction and a significant effect of preventing slump loss.

GROUP (2) OF EMBODIMENTS

Production Example (1) of Addition Condensate

A reaction vessel equipped with a stirrer was charged with 1.0 mol of phenol, 0.75 mol of sulfanilic acid and 0.25 mol of melamine, and a 40% aqueous sodium hydroxide solution and water were added thereto to adjust the pH value to 8.5 and the solid content to 35% by weight. Then, the solution was heated to a temperature of 85° C., a 37% formalin solution (2.5 mol in terms of formaldehyde) was added thereto with stirring, and the reaction mixture was stirred under reflux for 8 hr. Thereafter, the reaction mixture was cooled to 30° C., and the pH value was adjusted to 11 with a 40% aqueous sodium hydroxide solution. The mixture was stirred under reflux for 5 hr and cooled, and water was added thereto to adjust the solid content to 25% by weight, thereby preparing the concrete admixture of the present invention.

The details of addition copolycondensates of the present invention prepared according to the Production Example (1) are given in Production Examples 1 to 7 of Table 6. An addition copolycondensate of two components of phenol and melamine with formalin and an addition copolycondensate of two components of phenol and sulfanilic acid with formalin are given as comparative examples in Production Examples A and B of Table 6. In Table 6, the number of moles of formalin is the one in terms of formaldehyde (the same shall apply hereinafter).

Production on Example (2) of Addition Condensate

A reaction vessel equipped with a stirrer was charged with 1.0 mol of m cresol, 0.5 mol of naphthionic acid and 0.5 mol of melamine, and a 40% aqueous sodium hydroxide solution and water were added thereto to adjust the pH value to 8.1 and the solid content to 35% by weight. Then, the solution was heated to a temperature of 85° C., a 37% formalin solution (2. 5 mol in terms of formaldehyde) was added thereto with stirring, and the reaction mixture was stirred under reflux for 10 hr. Thereafter, the reaction mixture was cooled, and water was added thereto to adjust the solid content to 25%, thereby preparing the concrete admixture of the present invention.

The details of addition copolycondensate Nos. 8 to 10 of the present invention prepared according to the Production Example (2) are given in Table 7. The reaction temperature, pH and solid content were the same as those of Production Example 1.

Production Example (3) of Addition Condensate

A reaction vessel equipped with a stirrer was charged with 1.0 mol of phenol, 0.3 mol of sodium salt of Laurent's acid, 0.2 mol of sodium sulfanilate, 0.2 mol of melamine and 0.5 mol of urea, and a 10% aqueous sodium hydroxide solution and water were added thereto to adjust the pH value to 8.1 and the solid content to 35% by weight. Then, the solution was heated to a temperature of 85° C., a 37% formalin solution (2.5 mol in terms of formaldehyde) was added thereto with stirring, and the reaction mixture was stirred under reflux for 10 hr. Thereafter, the reaction mixture was cooled, and water was added thereto to adjust the solid content to 25%, thereby preparing the cement admixture of the present invention.

The details of addition copolycondensate Nos. 11 to 13 of the present invention prepared according to the Production Example (3) are given in Table 8. The reaction temperature, pH and solid content were the same as those of Production Example 1.

Production Example (4) of Addition Condensate

A reaction vessel equipped with a stirrer was charged with 1.0 mol of phenol, 0.1 mol of sodium sulfanilate and 1.0 mol of melamine, and a 0.1 N aqueous sodium hydroxide solution and water were added thereto to adjust the pH value to 8.5 and the solid content of 35% by weight. Then, the solution was heated to a temperature of 85° C., and formalin (3.3 mol in terms of formaldehyde) was added thereto with stirring, and the reaction mixture was stirred under reflux for 8 hr. Thereafter, the reaction mixture was cooled to 30° C. and the pH value was adjusted to 11 with a 40% aqueous sodium hydroxide solution. The mixture was stirred under reflux for 12 hr, 1.0 mol of sodium pyrosulfite was added thereto, formalin (1.2 mol in terms of formaldehyde) was added thereto while stirring, and the reaction mixture was stirred under reflux for 2 hr. The reaction mixture was cooled, and water was added thereto to adjust the solid content to 25%, thereby preparing the admixture of the present invention.

The details of addition copolycondensate Nos. 14 to 16 of the present invention prepared according to the Production Example (4) are given in Table 9.

Production Example (5) of Addition Condensate

A reaction vessel equipped with a stirrer was charged with 1.0 mol of melamine and formalin (2.0 mol in terms of formaldehyde), and the mixture was heated to 60° C. to completely dissolve the melamine in the formalin. Then 1.0 mol of sodium pyrosulfite was added thereto, and the mixture was heated at 80° C. for 2 hr. Then, 0.8 mol of phenol, 1.0 mol of sodium sulfanilate, a 0.1 N aqueous sodium hydroxide solution and water were added thereto and the resultant solution was heated to a temperature of 95° C. Formalin (1.8 mol in terms of formaldehyde) was added thereto, and the reaction mixture was stirred under reflux for 3 hr. Thereafter, the reaction mixture was cooled to room temperature, the pH value was adjusted to 11 with a 40% aqueous sodium hydroxide solution, and the solution was then stirred under reflux for 4 hr. The reaction mixture was cooled to room temperature, the pH value was adjusted to 9 with 20% sulfuric acid, and water was added thereto to adjust the solid content to 25% by weight, thereby preparing an addition copolycondensate of formalin.

The details of addition copolycondensate Nos. 17 to 19 of the present invention prepared according to the Production Example (5) are given in Table 10.

Production Example (6) of Addition Condensate

A reaction vessel equipped with a stirrer was charged with 1.0 mol of phenol, 0.75 mol of sulfanilic acid and 0.25 mol of melamine, and a 40% aqueous sodium hydroxide solution and water were added thereto to adjust the pH value to 8.5 and the solid content to 40%. The solution was heated to 85° C., formalin (2.5 mol in terms of formaldehyde) was added thereto, and the reaction mixture was stirred under reflux for 5 hr (first-stage reaction). Thereafter, the reaction mixture was cooled to 30° C., the pH value was adjusted to 11 with a 40% aqueous sodium hydroxide solution, the mixture was stirred under reflux for 3 hr (second-stage reaction) and cooled, and water was added thereto to adjust the solid content to 25%, thereby preparing a cement admixture. It is possible to prepare admixtures different from each other in the molecular weight through variation in the time of the first-stage reaction.

The details of addition copolycondensates prepared according to the Production Example (6) are given in Production Examples 20 to 22 of Table 11.

Production Examples 23 and 24

A cement admixture was prepared through the use of 50% by weight of the addition copolycondensate prepared in Production Example 1 and 50% by weight of a naphthalene sulfonate type dispersant, Mighty 150, tradename of Kao Corporation (Production Ex. 23).

Further, a cement admixture was prepared through the use of 60% by weight of the addition copolycondensate prepared in Production Example 1 and 40 wt.% of a melamine sulfonate type dispersant, Melment, tradename of Showa Denko K.K. No.24).

The results of evaluation are given in Tables 12 and 13.

Results of Evaluation

As is apparent from Tables 12 and 13, the admixtures of the present invention have a smaller difference in the slump value between immediately after the preparation and 60 min after the preparation than that of the admixtures of the Comparative Examples and exhibit an excellent effect of water reduction and a significant effect of preventing slump loss. Specifically, the addition copolycondensation of three or four specific components with formalin provides an addition copolycondensate having a performance unattainable by the addition copolycondensate to two components with formalin, and the effect is significant when the molar ratio of the compound of the formula (I) to the compound of the formula (IIb) and/or the compound of the formula (IIc) to the compound of the formula (IIIe) and/or the compound of the formula (IIIf) is (A):[(B)+(C)]:[(D)+(E)]=(0.10 to 1.0):(0.10 to 1.0):(0.10 to 1.0).

TABLE 6

| Classification | Production Ex. | Starting materials (molar ratio) | | | | Average molecular weight of produced addition polymer* |
|---|---|---|---|---|---|---|
| | | phenol | sulfanilic acid | melamine | formalin | |
| Product of present invention | 1 | 1.00 | 0.75 | 0.25 | 2.5 | 3625 |
| | 2 | 0.70 | 0.30 | 0.50 | 2.0 | 4156 |
| | 3 | 0.90 | 0.95 | 0.05 | 2.4 | 3277 |
| | 4 | 1.00 | 0.50 | 0.75 | 2.7 | 2129 |
| | 5 | 0.30 | 0.70 | 0.75 | 2.5 | 2067 |
| | 6 | 0.50 | 0.95 | 0.25 | 2.5 | 2562 |
| | 7 | 1.00 | 0.40 | 0.95 | 3.5 | 6754 |
| Comparative product | A | 1.00 | — | 1.00 | 2.5 | 6839 |
| | B | 1.00 | 1.00 | — | 2.5 | 2756 |

Note:
*measured by gel permeation chromatography (in terms of average molecular weight of polystyrene; the same shall apply to the following production examples)

reaction). Thereafter, the reaction mixture was cooled

TABLE 7

| Classification | Production Ex. | Starting materials (molar ratio) | | | | Average molecular weight of produced addition polymer |
|---|---|---|---|---|---|---|
| | | m-cresol | naphthionic acid | melamin | formalin | |
| Product of present | 8 | 1.0 | 0.50 | 0.50 | 2.5 | 2120 |
| | 9 | 0.8 | 0.75 | 0.25 | 2.3 | 2920 |

TABLE 7-continued

| Classification | Production Ex. | Starting materials (molar ratio) | | | | Average molecular weight of produced addition polymer |
|---|---|---|---|---|---|---|
| | | m-cresol | naphthionic acid | melamin | formalin | |
| invention | 10 | 0.5 | 0.95 | 0.05 | 2.5 | 3266 |

TABLE 8

| Classification | Product of present invention | | |
|---|---|---|---|
| Production Ex. | 11 | 12 | 13 |
| Starting materials | | | |
| phenol | 0.1 | 0.3 | 0.6 |
| sodium sulfanilate | 0.2 | 0.6 | 0.3 |
| sodium salt of Laurent's acid | 0.3 | 0.15 | 0.65 |
| melamine | 0.2 | 0 | 0.05 |

TABLE 8-continued

| Classification | Product of present invention | | |
|---|---|---|---|
| Production Ex. | 11 | 12 | 13 |
| urea | 0.5 | 0.25 | 0 |
| formalin | 2.5 | 1.8 | 2.1 |
| Molecular weight of produced addition polymer | 2320 | 3290 | 4211 |

TABLE 9

| Classification | Production Ex. | Starting materials (molar ratio) | | | | | Average molecular weight of produced addition polymer |
|---|---|---|---|---|---|---|---|
| | | phenol | melamine | sodium sulfanilate | sodium pyrosulfite | formalin | |
| Product of | 14 | 1.0 | 1.0 | 0.1 | 1.0 | 4.5 | 15300 |
| present | 15 | 0.7 | 0.4 | 0.8 | 2.5 | 5.3 | 11000 |
| invention | 16 | 0.3 | 0.8 | 0.6 | 1.6 | 4.0 | 6800 |

TABLE 10

| Classification | Production Ex. | Starting materials (molar ratio) | | | | | Average molecular weight of produced addition polymer |
|---|---|---|---|---|---|---|---|
| | | phenol | melamine | sodium sulfanilate | sodium pyrosulfite | formalin | |
| Product of | 17 | 0.8 | 1.0 | 1.0 | 1.0 | 3.8 | 8400 |
| present | 18 | 1.0 | 0.3 | 0.5 | 1.5 | 5.0 | 13200 |
| invention | 19 | 0.2 | 0.7 | 0.4 | 2.5 | 4.5 | 25700 |

TABLE 11

| Classification | Production Ex. | Starting materials (molar ratio) | | | Average molecular weight of produced addition polymer |
|---|---|---|---|---|---|
| | | Ph:Su:Me* | first step (hr) | second step (hr) | |
| Product of | 20 | 1.0:0.75:0.25 | 5 | 3 | 1120 |
| present | 21 | 1.0:0.75:0.25 | 10 | 3 | 4523 |
| invention | 22 | 1.0:0.75:0.25 | 40 | 3 | 47650 |

Note:
*Ph: phenol
Su: sulfanilic acid
Me: melamine

TABLE 12

| Classification | Admixture | Amt. of addition (%)* | Slump (cm) | | | Amt. of air (%) | |
|---|---|---|---|---|---|---|---|
| | | | immediately after preparation | 60 min after preparation | difference | immediately after preparation | 60 min after preparation |
| Products of the present invention | Production Ex. 1 | 0.45 | 20.5 | 19.5 | 1.0 | 1.1 | 1.0 |
| | Production Ex. 2 | 0.50 | 20.3 | 19.0 | 1.3 | 1.0 | 1.0 |
| | Production Ex. 3 | 0.42 | 20.2 | 19.8 | 0.4 | 1.0 | 0.9 |
| | Production Ex. 4 | 0.53 | 20.5 | 15.1 | 5.4 | 0.9 | 0.9 |
| | Production Ex. 5 | 0.55 | 20.6 | 15.2 | 5.4 | 1.2 | 1.0 |
| | Production Ex. 6 | 0.55 | 20.3 | 17.9 | 2.4 | 1.2 | 0.9 |
| | Production Ex. 7 | 0.57 | 20.7 | 15.5 | 5.2 | 0.9 | 0.9 |
| | Production Ex. 8 | 0.50 | 20.1 | 15.3 | 4.8 | 1.3 | 1.1 |
| | Production Ex. 9 | 0.51 | 20.8 | 18.1 | 2.7 | 1.2 | 1.0 |
| | Production Ex. 10 | 0.52 | 20.1 | 17.5 | 2.6 | 1.2 | 1.0 |
| | Production Ex. 11 | 0.53 | 20.6 | 18.1 | 2.5 | 1.1 | 1.0 |
| | Production Ex. 12 | 0.52 | 20.2 | 17.9 | 2.3 | 1.1 | 1.0 |
| | Production Ex. 13 | 0.52 | 20.6 | 17.2 | 3.4 | 1.2 | 1.0 |
| | Production Ex. 14 | 0.48 | 20.5 | 18.5 | 2.0 | 1.1 | 1.0 |

Note:
In the table, the amount of addition is solid content (%) based on cement.

TABLE 13

| Classification | Admixture | Amt. of addition (%)* | Slump (cm) immediately after preparation | Slump (cm) 60 min after preparation | difference | Amt. of air (%) immediately after preparation | Amt. of air (%) 60 min after preparation |
|---|---|---|---|---|---|---|---|
| Products of the present invention | Production Ex. 15 | 0.46 | 20.1 | 17.9 | 2.2 | 1.0 | 0.9 |
| | Production Ex. 16 | 0.43 | 20.3 | 18.7 | 1.6 | 1.2 | 1.2 |
| | Production Ex. 17 | 0.51 | 20.4 | 19.0 | 1.4 | 1.0 | 1.0 |
| | Production Ex. 18 | 0.47 | 20.3 | 17.5 | 2.8 | 1.3 | 1.1 |
| | Production Ex. 19 | 0.50 | 20.1 | 18.2 | 1.9 | 1.2 | 1.0 |
| | Production Ex. 20 | 0.50 | 20.7 | 17.9 | 2.8 | 1.1 | 1.0 |
| | Production Ex. 21 | 0.48 | 20.1 | 19.1 | 1.0 | 1.2 | 1.0 |
| | Production Ex. 22 | 0.56 | 20.2 | 16.0 | 4.2 | 1.2 | 1.0 |
| | Production Ex. 23 | 0.60 | 20.1 | 17.3 | 2.8 | 1.4 | 1.2 |
| | Production Ex. 24 | 0.58 | 20.4 | 17.8 | 2.6 | 1.2 | 1.0 |
| Comparative products | Production Ex. A | 0.60 | 20.2 | 11.5 | 8.7 | 1.4 | 1.1 |
| | Production Ex. B | 0.58 | 20.6 | 12.2 | 8.4 | 1.3 | 1.0 |
| | Production Ex. C | 0.60 | 20.2 | 10.1 | 10.1 | 1.4 | 1.1 |
| | Production Ex. D | 0.58 | 20.3 | 9.5 | 10.8 | 1.3 | 1.0 |

Note:
In the table, the amount of addition is solid content (%) based on cement.
Production Ex. C: a naphthalene dispersant (Mighty 150; a production of Kao Corp.)
Production Ex. D: a melamine dispersant (Melment; a product of Showa Denko K.K.)

GROUP (3) OF EMBODIMENTS

Production Example (1) of Copolycondensate

A reaction vessel equipped with a stirrer was charged with 0.5 mol of phenol, 1.0 mol of sodium phenolsulfonate and 0.5 mol of melamine, and a 0.1 N aqueous sodium hydroxide solution and water were added thereto to adjust the pH value to 8.5 and the solid content to 35% by weight. Then, the solution was heated to a temperature of 85° C., an aqueous formalin solution (2.5 mol in terms of formaldehyde) was added thereto with stirring, and the reaction mixture was stirred under reflux for 10 hr. Thereafter, the reaction mixture was cooled to 30° C., and the pH value was adjusted to 11 with a 40% aqueous sodium hydroxide solution. The mixture was stirred under reflux for 5 hr and cooled, and water was added thereto to adjust the solid content to 25% by weight, thereby preparing the cement admixture of the present invention.

The details of copolycondensate Nos. 1 to 7 of the present invention prepared according to the Production Example (1) are given in Table 14. In Table 14, the number of moles of formalin is the one in terms of formaldehyde (the same shall apply to the following production examples).

Production Example (2) of Copolycondensate

A reaction vessel equipped with a stirrer was charged with 1.0 mol of sodium m-cresolsulfonate, and a 0.1 N aqueous sodium hydroxide solution and water were added thereto to adjust the pH value to 8.5. Then, the solution was heated to a temperature of 85° C., and formalin (2.5 mol in terms of formaldehyde) was added thereto with stirring, and the reaction mixture was stirred under reflux for 5 hr. Thereafter, the reaction mixture was cooled to 30° C., 0.5 mol of m-cresol and 0.5 mol of melamine were added thereto, and the pH value was adjusted to 11 with a 40% aqueous sodium hydroxide solution. The mixture was stirred under reflux for 12 hr and cooled, and 1.0 mol of sodium sulfite and water were added thereto to adjust the solid content to 25% by weight, thereby preparing the cement admixture of the present invention.

The details of copolycondensate Nos. 8 to 10 of the present invention prepared according to the Production Example (2) are given in Table 15.

Production Example (3) of Copolycondensate

A reaction vessel equipped with a stirrer was charged with 1.0 mol of sodium phenolsulfonate, and a 0.1 N aqueous sodium hydroxide solution and water were added thereto to adjust the pH value to 8.5. Then, the solution was heated to a temperature of 85° C., and 2.5 mol of formalin was added thereto with stirring, and the reaction mixture was stirred under reflux for 5 hr (first step). Thereafter, the reaction mixture was cooled to 30° C., 0.5 mol of phenol and 0.5 mol of melamine were added thereto, the pH value was adjusted to 11 with a 40% aqueous sodium hydroxide solution, the mixture was stirred under reflux for 5 hr (second step) and cooled, and 1.0 mol of sodium sulfite and water were added thereto to adjust the solid content to 25% by weight, thereby preparing the cement admixture of the present invention. It is possible to prepare cement admixtures different from each other in the molecular weight through variation in the reaction time.

The details of copolycondensate Nos. 11 to 13 of the present invention prepared according to the Production Example (3) are given in Table 16.

Production Example (4) of Copolycondensate

A reaction vessel equipped with a stirrer was charged with 1.0 mol of phenol, 1.0 mol of sodium phenolsulfonate and 1.0 mol of melamine, and a 0.1 N aqueous sodium hydroxide solution and water were added thereto to adjust the pH value to 8.5 and the solid content to 35% by weight. Then, the solution was heated to a temperature of 85° C., formalin (3.3 mol in terms of formaldehyde) was added thereto with stirring, and the reaction mixture was stirred under reflux for 8 hr. Thereafter, the reaction mixture was cooled to 30° C., the pH value was adjusted to 11 with a 40% aqueous sodium hydroxide solution, and the mixture was stirred under reflux for 12 hr. After stirring, 2.5 mol of sodium pyrosulfite was added thereto, formalin (3.0 mol in terms of formaldehyde) was added thereto while stirring, and the reaction mixture was stirred under reflux for 2 hr. The reaction mixture was cooled, and water was added thereto to adjust the solid content to 25% by weight, thereby preparing the cement admixture of the present invention.

The details of copolycondensates Nos. 14 to 16 of the present invention prepared according to the Production Example (4) are given in Table 17.

Production Example (5) of Copolycondensate

A reaction vessel equipped with a stirrer was charged with 0.9 mol of phenol, 1.0 mol of melamine and formalin (2.8 mol in terms of formaldehyde), and the mixture was heated to 60° C. to completely dissolve the melamine in the formalin. Then 1.5 mol of sodium pyrosulfite was added thereto, and the mixture was heated at 80° C. for 2 hr. Then, 1.0 mol of sodium phenolsulfonate, a 0.1 N aqueous sodium hydroxide solution and water were added thereto, and the resultant solution was heated to a temperature of 95° C. Formalin (3.0 mol in terms of formaldehyde) was added thereto, and the reaction mixture was stirred under reflux for 3 hr. Thereafter, the reaction mixture was cooled to room temperature, the pH value was adjusted to 11 with a 40% aqueous sodium hydroxide solution, and the solution was then stirred under reflux for 4 hr. The reaction mixture was cooled to room temperature, the pH value was adjusted to 9 with 20% sulfuric acid, and water was added thereto to adjust the solid content to 25% by weight, thereby preparing a copolycondensate of formalin.

The details of copolycondensate Nos. 17 to 19 of the present invention prepared according to the Production Example (5) are given in Table 18.

Production Example (6)

A cement admixture was prepared through the use of 70% by weight of the copolycondensate No. 1 prepared in Production Example 1 and 30% by weight of a naphthalene dispersant (Mighty 150; a product of Kao Corp.) (Product No. 20 of the present invention).

Further, a cement admixture was prepared through the sue of 50% by weight of the copolycondensate No. 3 prepared in Production Example 3 and 50% by weight of a melamine dispersant (Melment; a product of Showa Denko K.K.) (Product No. 21 of the present invention).

The results of evaluation rae given in Table 19.

Note

*: Amt. of addition: solid content (%) based on cement
**: Comparative Product A: naphthalene dispersant (Mighty 150; a product of Kao Corp.)
***: Comparative Product B: melamine dispersant (Melment; a product of Showa Denko K.K.)

Results of Evaluation

As is apparent from Table 19, the admixtures of the present invention have a smaller difference in the slump value between immediately after the preparation and 60 min after the preparation than that of the admixtures of the comparative products and exhibit an excellent effect of water reduction and a significant effect of preventing slump loss.

TABLE 14

| Copolycondensate No. | Starting materials (molar ratio) | | | | | Average molecular weight of produced copolycondensate* |
|---|---|---|---|---|---|---|
| | phenol | sodium phenolsulfonate | melamine | urea | formalin | |
| 1 | 0.50 | 1.00 | 0.50 | — | 2.5 | 5200 |
| 2 | 0.70 | 0.10 | 0.80 | — | 3.5 | 23500 |
| 3 | 0.10 | 0.90 | 1.00 | — | 2.5 | 5400 |
| 4 | 1.00 | 0.50 | 0.20 | 0.30 | 3.0 | 7000 |
| 5 | 0.50 | 0.10 | — | 0.50 | 2.5 | 7200 |
| 6 | 0.90 | 0.70 | 0.50 | 0.10 | 2.5 | 6500 |
| 7 | 0.30 | 1.00 | — | 0.70 | 3.0 | 4500 |

Note:
*measured by gel permeation chromatography (in terms of average molecular weight of polystyrene; the same shall apply to the following production examples).

TABLE 15

| Copolycondensate No. | Starting materials (molar ratio) | | | | Average molecular weight of produced copolycondensate |
|---|---|---|---|---|---|
| | m-cresol | sodium m-cresolsulfonate | melamine | formalin | |
| 8 | 0.50 | 1.00 | 0.50 | 2.5 | 3500 |
| 9 | 0.10 | 0.50 | 1.00 | 3.0 | 6600 |
| 10 | 0.30 | 1.00 | 0.70 | 3.5 | 5200 |

TABLE 16

| Copolycondensate No. | Starting materials* (molar ratio) Ph:Ps:Me | Conditions for addition condensation | | Average molecular weight of produced copolycondensate |
|---|---|---|---|---|
| | | 1st step (hr) | 2nd step (hr) | |
| 14 | 0.5:1.0:0.5 | 5 | 5 | 3500 |
| 15 | 0.5:1.0:0.5 | 5 | 15 | 13400 |
| 16 | 0.5:1.0:0.5 | 5 | 30 | 37500 |

Note:
*Ph: phenol
Ps: sodium phenosulfonate
Me: melamine

TABLE 17

| Copolycondensate No. | Starting materials (molar ratio) | | | | | Average molecular weight of produced copolycondensate |
|---|---|---|---|---|---|---|
| | phenol | sodium sulfonate | melamine | sodium pyrosulfite | formalin | |
| 14 | 1.0 | 1.0 | 1.0 | 2.5 | 6.3 | 19300 |
| 15 | 0.7 | 0.5 | 0.9 | 1.2 | 3.7 | 11000 |
| 16 | 0.3 | 0.8 | 0.3 | 0.3 | 2.2 | 5500 |

TABLE 18

| Copolycondensate No. | Starting materials (molar ratio) | | | | | Average molecular weight of produced copolycondensate |
|---|---|---|---|---|---|---|
| | phenol | sodium sulfonate | melamine | sodium pyrosulfite | formalin | |
| 17 | 0.9 | 1.0 | 1.0 | 1.5 | 5.8 | 19000 |

TABLE 18-continued

| Copoly-condensate No. | Starting materials (molar ratio) | | | | | Average molecular weight of produced copolycondensate |
|---|---|---|---|---|---|---|
| | phenol | sodium sulfonate | melamine | sodium pyrosulfite | formalin | |
| 18 | 0.5 | 1.0 | 0.9 | 0.5 | 3.3 | 12300 |
| 19 | 0.3 | 0.7 | 0.5 | 1.6 | 3.4 | 5300 |

TABLE 19

| Classification | Copoly-condensate No. | Amt. of addition (%)* | Slump (cm) | | | Amt. of air (%) | |
|---|---|---|---|---|---|---|---|
| | | | immediately after preparation | 60 min after preparation | difference | immediately after preparation | 60 min after preparation |
| Products of the present invention | 1 | 0.50 | 20.3 | 17.3 | 3.0 | 1.3 | 1.1 |
| | 2 | 0.55 | 20.4 | 15.1 | 5.3 | 1.2 | 1.0 |
| | 3 | 0.51 | 20.1 | 17.1 | 3.0 | 1.3 | 0.8 |
| | 4 | 0.51 | 20.1 | 16.0 | 4.1 | 1.2 | 1.0 |
| | 5 | 0.53 | 19.8 | 15.1 | 4.7 | 1.3 | 1.1 |
| | 6 | 0.53 | 19.8 | 14.8 | 5.0 | 1.2 | 1.0 |
| | 7 | 0.53 | 20.1 | 14.0 | 6.1 | 1.1 | 0.8 |
| | 8 | 0.50 | 20.2 | 16.4 | 3.8 | 1.0 | 0.9 |
| | 9 | 0.51 | 20.1 | 17.1 | 3.0 | 1.2 | 1.0 |
| | 10 | 0.49 | 19.8 | 16.9 | 2.9 | 1.3 | 1.0 |
| | 11 | 0.52 | 20.1 | 15.7 | 4.4 | 1.2 | 1.0 |
| | 12 | 0.54 | 20.2 | 14.1 | 6.1 | 1.4 | 1.0 |
| | 13 | 0.56 | 20.1 | 13.0 | 7.1 | 1.2 | 0.8 |
| | 14 | 0.53 | 20.1 | 16.8 | 3.3 | 1.2 | 1.0 |
| | 15 | 0.49 | 20.3 | 17.2 | 3.1 | 1.1 | 0.8 |
| | 16 | 0.51 | 19.8 | 15.1 | 3.9 | 1.2 | 1.1 |
| | 17 | 0.48 | 19.9 | 16.3 | 3.6 | 1.0 | 0.9 |
| | 18 | 0.50 | 20.4 | 17.5 | 2.9 | 1.3 | 1.0 |
| | 19 | 0.52 | 20.0 | 17.0 | 3.0 | 1.1 | 0.8 |
| | 20 | 0.60 | 20.1 | 14.8 | 5.3 | 1.5 | 1.2 |
| | 21 | 0.67 | 20.2 | 15.3 | 4.9 | 1.4 | 1.2 |
| Comparative products | A** | 0.60 | 20.0 | 7.5 | 12.5 | 1.7 | 1.4 |
| | B** | 0.67 | 20.0 | 8.1 | 11.9 | 1.3 | 1.1 |

GROUP (1-1) OF EMBODIMENTS

Examples of Group (1) include a condensation product from co-monomers (I), (IIa) and (IIId) and formaldehyde. The Group (1-1) here extends to the use of (IIb), (IIc), (IVg) and/or (IVh) as the third co-monomer.

Production Example (5) of Addition Condensate

Production Example (2) of Group (1) was followed except for replacing sodium naphthionate for sodium sulphanilate. Results of Nos. 8, 9 and 10 are shown in Table 20.

Production Example (6) of Addition Condensate

Production Example (3) of Group (1) was followed except for replacing sodium sulphamate for sodium sulphanilate. Results of Nos. 11, 12 and 13 are shown in Table 21.

Production Example (7) of Addition Condensate

A reactor equipped with a stirrer was charged with 1.0 mole of phenol, 0.2 mole of phenolsulfonic acid, 0.2 mole of sodium 6-amino-4-hydroxy-2-naphthalenesulfonate and 0.8 mole of N-methylsulfonated urea and then a 10% aqueous solution of sodium hydroxide and water to adjust a pH of the mixture at 5.6 and a solid content at 35 wt. %. The solution was heated up to 85° C. and formaline was added thereto in an amount of 2.5 moles as formaldehyde, while stirred. The reaction mixture was stirred with refluxing for 10 hours. Having been cooled, water was added to the production mixture to adjust its solid content at 25 wt. % and obtain cement dispersants Nos. 17, 18 and 19. Results are shown in Table 22.

Production Example (8) of Addition Condensate

A cement additive No. 20 was prepared from 70 wt. % of the condensate No. 1 of Production Example (1) of Group (1) and 50 wt. % of Melment, a melamine dispersant being available from Showa Denko K.K.

Evaluation of Addition Condensates as Cement Additive

The same test as shown in Group (1) was carried out in respect to the addition condensate Nos. 8 to 13 and the following Nos. 17 to 21. Results are shown in Table 23.

TABLE 20

| Addition condensate No. | Starting materials (molar ratio) | | | | Average molecular weight of produced addition polymer* | Mw/Mn |
|---|---|---|---|---|---|---|
| | m-cresol | sodium phenolsulfonate | sodium naphthionate | formalin | | |
| 8 | 0.60 | 0.50 | 1.00 | 2.4 | 3800 | 1.3 |
| 9 | 0.60 | 0.10 | 1.00 | 2.6 | 6500 | 1.5 |
| 10 | 1.00 | 0.50 | 0.50 | 3.0 | 5200 | 1.7 |

TABLE 21

| Addition condensate No. | Starting materials (molar ratio) | | | | Average molecular weight of produced addition polymer* | Mw/Mn |
|---|---|---|---|---|---|---|
| | phenol | sodium m-cresolsulfonate | sodium sulphamate | formalin | | |
| 11 | 0.50 | 0.50 | 1.00 | 2.0 | 3800 | 1.5 |
| 12 | 0.50 | 0.10 | 1.00 | 2.8 | 2800 | 1.2 |
| 13 | 0.50 | 0.50 | 0.75 | 3.0 | 4300 | 1.7 |

TABLE 22

| starting monomer (molar ratio) | condensate No. | | |
|---|---|---|---|
| | 17 | 18 | 19 |
| phenol | 1.0 | 1.0 | 0.8 |
| phenolsulfonic acid | 0.2 | 0.2 | 0.5 |
| sodium 6-amino-4-hydroxy-2-naphthalenesulfonate | 0.2 | 0.7 | 0 |
| N-methylsulfonated urea | 0.8 | 0.1 | 1.1 |
| formalin | 2.5 | 2.8 | 3.0 |
| molecular weight (Mw) on the average | 3400 | 5300 | 7200 |
| Mw/Mn | 1.3 | 1.6 | 1.8 |

TABLE 23

| condensate No. | amount of addition | slump (cm) | | | amount of air (%) | | |
|---|---|---|---|---|---|---|---|
| | | just after preparation | in 60 mins. | difference | just after preparation | in 60 mins. | |
| 8 | 0.51 | 20.0 | 16.3 | 3.7 | 1.1 | 0.9 | |
| 9 | 0.48 | 20.3 | 17.0 | 3.3 | 1.1 | 1.1 | |
| 10 | 0.52 | 20.1 | 17.4 | 2.7 | 1.2 | 1.0 | |
| 11 | 0.50 | 20.1 | 18.0 | 2.1 | 1.3 | 1.1 | |
| 12 | 0.50 | 20.0 | 17.3 | 2.7 | 1.1 | 1.0 | |
| 13 | 0.51 | 20.1 | 17.5 | 2.6 | 1.2 | 1.0 | |
| 17 | 0.53 | 20.0 | 18.5 | 1.5 | 1.1 | 0.9 | |
| 18 | 0.51 | 19.8 | 17.3 | 2.5 | 1.2 | 1.0 | |
| 19 | 0.54 | 20.3 | 17.7 | 2.6 | 1.2 | 0.9 | |
| 20 | 0.60 | 20.0 | 15.9 | 4.1 | 1.6 | 1.3 | |
| 21 | 0.67 | 20.1 | 15.3 | 4.8 | 1.3 | 1.1 | |

We claim:

1. An additive to cement comprising a condensation product of formaldehyde with:

(I), (IIa) and (IIb);
(I), (IIa) and (IIc);
(I), (IIa) and (IVg);
(I), (IIa) and (IVh);
(I), (IIa), (IIb) and (IIc);
(I), (IIa), (IIb) and (IVg);
(I), (IIa), (IIb) and (IVh);
(I), (IIa), (IIb), (IIc) and (IVg);
(I), (IIa), (IIb), (IVg) and (IVh);
(I), (IIa), (IIb), (IIc) and (IVh);
(I), (IIa), (IIb), (IIc), (IVg) and (IVh);
(I), (IIa), (IIc) and (IVg);
(I), (IIa), (IIc) and (IVh);
(I), (IIa), (IIc), (IVg) and (IVh);
(I), (IIa), (IVg) and (IVh);
(I), (IIb) and (IIIe);
(I), (IIc) and (IIIe);
(I), (IIb) and (IIIf);
(I), (IIc) and (IIIf);
(I), (IIb), (IIc) and (IIIe);
(I), (IIb), (IIc) and (IIIf);
(I), (IIb), (IIIe) and (IIIf);
(I), (IIc), (IIIe) and (IIIf);
(I), (IIb), (IIc), (IIIe) and (IIIf);
(I), (IIa) and (IIIe);
(I), (IIa) and (IIIf); or
(I), (IIa), (IIIe) and (IIIf)
in which (I) is a phenol compound having the formula (I),
(IIa) is a phenol sulfonate having the formula (IIa),
(IIb) is an aniline compound having the formula (IIb);
(IIc) is an aminonaphthalene compound having the formula (IIc);
(IIIe) is a melamine compound having the formula (IIIe);
(IIIf) is a urea compound having the formula (IIIf);
(IVg) is $H_2NCON(Z)CH_2SO_3M$; and
(IVh) is $H_2NSO_3M$,

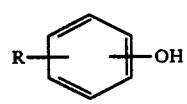
(I)

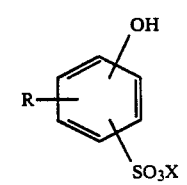
(IIa)

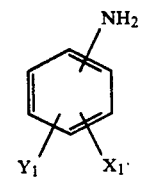
(IIb)

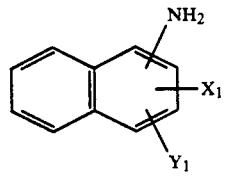
(IIc)

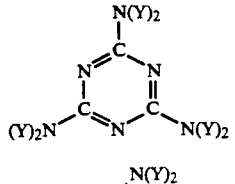
(IIIe)

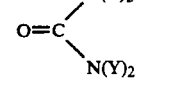
(IIIf)

wherein,
R is hydrogen or an alkyl group having 1 to 6 carbon atoms;
X is an alkali metal;
$X_1$ is hydrogen, an alkyl group having 1 to 6 carbon atoms, carboxylic acid group, an alkali metal carboxylate, a sulfonic acid group, an alkali metal sulfonate, hydroxy or methoxy;

$Y_1$ is a carboxylic acid or an alkali metal carboxylate, a sulfonic acid group or an alkali metal sulfonate;

Y is hydrogen or an alkali metal;

Z is hydrogen, an alkyl group having 1 to 6 carbon atoms or $-CH_2SO_3M$; and

M is hydrogen or an alkali metal.

2. The additive as claimed in claim 1, which comprises a condensation product of formaldehyde with (I), (IIa) and (IIb), in which $X_1$ is hydrogen; and $Y_1$ is an alkali metal sulfonate.

3. The additive as claimed in claim 1, which comprises a condensation product of formaldehyde with (I), (IIb) and (IIIe); or (I), (IIb) and (IIIf), in which $X_1$ is hydrogen; $Y_1$ is sulfonyl or an alkali metal sulfonate; and Y is hydrogen.

4. The additive as claimed in claim 1, which comprises a condensation product of formaldehyde with (I), (IIa) and (IIIe);

(I), (IIa) and (IIIf); or (I), (IIa), (IIIe) and (IIIf), in which Y is hydrogen.

5. A cement composition which comprises cement, aggregates and an effective cement dispersing amount of the additive as defined in claim 1.

6. A method for dispersing cement and aggregates with each other by adding the additive as defined in claim 1 to said cement and aggregates.

7. A process for producing concrete by mixing cement, aggregates, water and the additive as defined in claim 1 to produce said concrete.

8. The additive composition as claimed in claim 1, further comprising a condensate of naphthalenesulfonic acid with formaldehyde, a metal salt thereof, a condensate of melaminesulfonic acid with formaldehyde, a metal salt thereof, lignosulfonic acid or a metal salt thereof.

* * * * *